United States Patent
Iijima et al.

(10) Patent No.: US 10,434,694 B2
(45) Date of Patent: Oct. 8, 2019

(54) RESIN MOLDING METHOD

(71) Applicant: CANON KABUSHIKI KAISHA, Tokyo (JP)

(72) Inventors: Yasushi Iijima, Tokyo (JP); Yukuo Yamaguchi, Tokyo (JP); Mikiya Umeyama, Tokyo (JP); Satoshi Oikawa, Yokohama (JP); Hiromasa Amma, Kawasaki (JP); Takuya Iwano, Inagi (JP); Satoshi Kimura, Kawasaki (JP); Naoko Tsujiuchi, Kawasaki (JP); Kyosuke Toda, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 221 days.

(21) Appl. No.: 15/631,120

(22) Filed: Jun. 23, 2017

(65) Prior Publication Data

US 2018/0001527 A1    Jan. 4, 2018

(30) Foreign Application Priority Data

Jun. 30, 2016 (JP) ................................. 2016-130581

(51) Int. Cl.
*B29C 45/16* (2006.01)
*B29C 45/06* (2006.01)
(Continued)

(52) U.S. Cl.
CPC .......... *B29C 45/1604* (2013.01); *B29C 45/06* (2013.01); *B29C 45/1607* (2013.01);
(Continued)

(58) Field of Classification Search
CPC .... B29C 2045/0072; B29C 2045/1637; B29C 45/1628; B29C 2045/1629–1632;
(Continued)

(56) References Cited

U.S. PATENT DOCUMENTS

2010/0171798 A1* 7/2010 Yamaguchi .......... B41J 2/16532
                                                                          347/85
2016/0346967 A1   12/2016 Oikawa et al.
(Continued)

FOREIGN PATENT DOCUMENTS

JP      2002-178538 A      6/2002

OTHER PUBLICATIONS

Tsujiuchi et al., U.S. Appl. No. 15/649,482, filed Jul. 13, 2017.
(Continued)

*Primary Examiner* — William P Bell
*Assistant Examiner* — Andrew L Swanson
(74) *Attorney, Agent, or Firm* — Venable LLP (57) ABSTRACT

A resin molding method includes a first molding step of molding a first molded part and a second molded part in a mold and a second molding step of joining the first molded part and the second molded part. In the first molding step, the second molded part is formed by injecting resin into an area where a first core movable in the first direction and a second core movable in a second direction are engaged. In the second molding step, the second molded part is joined to the first molded part by injecting the resin while the first core is in contact with the second molded part and the second core is removed from the second molded part. Areas where the first core and the second core are located in the first molding step become hollow areas connected to each other and part of ends of the first core in the first direction is not in contact with the second core.

7 Claims, 13 Drawing Sheets

(51) Int. Cl.
*B41J 2/175* (2006.01)
*B29C 45/00* (2006.01)
*B29C 45/44* (2006.01)
*B41J 2/14* (2006.01)
*B29L 31/00* (2006.01)

(52) U.S. Cl.
CPC ....... *B29C 45/1635* (2013.01); *B41J 2/17553* (2013.01); *B41J 2/17559* (2013.01); *B29C 45/162* (2013.01); *B29C 45/1615* (2013.01); *B29C 2045/0072* (2013.01); *B29C 2045/161* (2013.01); *B29C 2045/1614* (2013.01); *B29C 2045/1617* (2013.01); *B29C 2045/4464* (2013.01); *B29L 2031/7678* (2013.01); *B41J 2002/14475* (2013.01)

(58) Field of Classification Search
CPC .......... B29C 45/1615; B29C 2043/503–5038; B29C 45/06–062; B29C 45/0062; B29C 45/33; B29C 2045/0063; B29L 2031/7678
See application file for complete search history.

(56) References Cited

U.S. PATENT DOCUMENTS

| | | |
|---|---|---|
| 2016/0346969 A1 | 12/2016 | Toda et al. |
| 2016/0346970 A1 | 12/2016 | Oikawa et al. |
| 2016/0346976 A1 | 12/2016 | Tsujiuchi et al. |
| 2016/0347072 A1 | 12/2016 | Iwano et al. |

OTHER PUBLICATIONS

Tsujiuchi et al., U.S. Appl. No. 15/649,472, filed Jul. 13, 2017.

* cited by examiner

RESIN MOLDING METHOD

BACKGROUND OF THE INVENTION

Field of the Invention

The present invention relates to a resin molding method.

Description of the Related Art

In general, a flow channel configuration of a liquid ejection head having a winding hollow structure is often molded from resin in view of the ease of manufacturing, lightness, and resistance to corrosion. Japanese Patent Laid-Open No. 2002-178538 discloses a method of performing primary molding by injecting resin into different cavities in the same mold and mold the resin into parts for implementing a complicated internal structure, and then performing secondary molding by engaging the parts in the same mold and further injecting resin into the engaged portions. The above manufacturing method is hereinafter referred to as die slide injection molding. The adoption of the die slide injection molding makes it possible to manufacture molded articles having a complicated internal structure such as the above flow channel configuration with high accuracy and efficiency.

In the die slide injection molding, in secondary molding for engaging and joining hollow structural parts that are separately formed in primary molding, a resin injection pressure for joining may act on the primarily molded parts and deform them. In particular, if the primarily molded parts have a complicated hollow structure like flow channels of an inkjet head, the deformation affects the volume and shape of each liquid chamber, with the result that an ink ejection state becomes unstable. Further, if the primarily molded parts are deformed in the secondary molding, resin does not flow into necessary portions and the molded parts are not completely joined, which leads to a decrease in yields.

SUMMARY OF THE INVENTION

The present invention has been accomplished in order to solve the above problem. Accordingly, the present invention aims to provide a resin molding method with high quality and productivity by reliably injecting resin into target portions while preventing primarily molded parts from being deformed along with resin injection in secondary molding in die slide injection molding.

A resin molding method comprising: a first molding step of molding a first molded part and a second molded part in different positions in a mold by injecting resin into the mold; and a second molding step of joining the first molded part and the second molded part to form a resin molded article by engaging the first molded part and the second molded part in a first direction inside the mold and injecting resin into engaged portions, wherein in the first molding step, the second molded part is formed by injecting resin into an area where a first core movable in the first direction and a second core movable in a second direction intersecting with the first direction are engaged, in the second molding step, the second molded part is joined to the first molded part by injecting the resin while the first core is in contact with the second molded part and the second core is removed from the second molded part, areas where the first core and the second core are located in the first molding step become hollow areas connected to each other by removing the first core and the second core from the second molded part, and in the engagement in the first molding step, part of ends of the first core in the first direction is not in contact with the second core.

Further features of the present invention will become apparent from the following description of exemplary embodiments with reference to the attached drawings.

DESCRIPTION OF THE EMBODIMENTS

Figure 1:
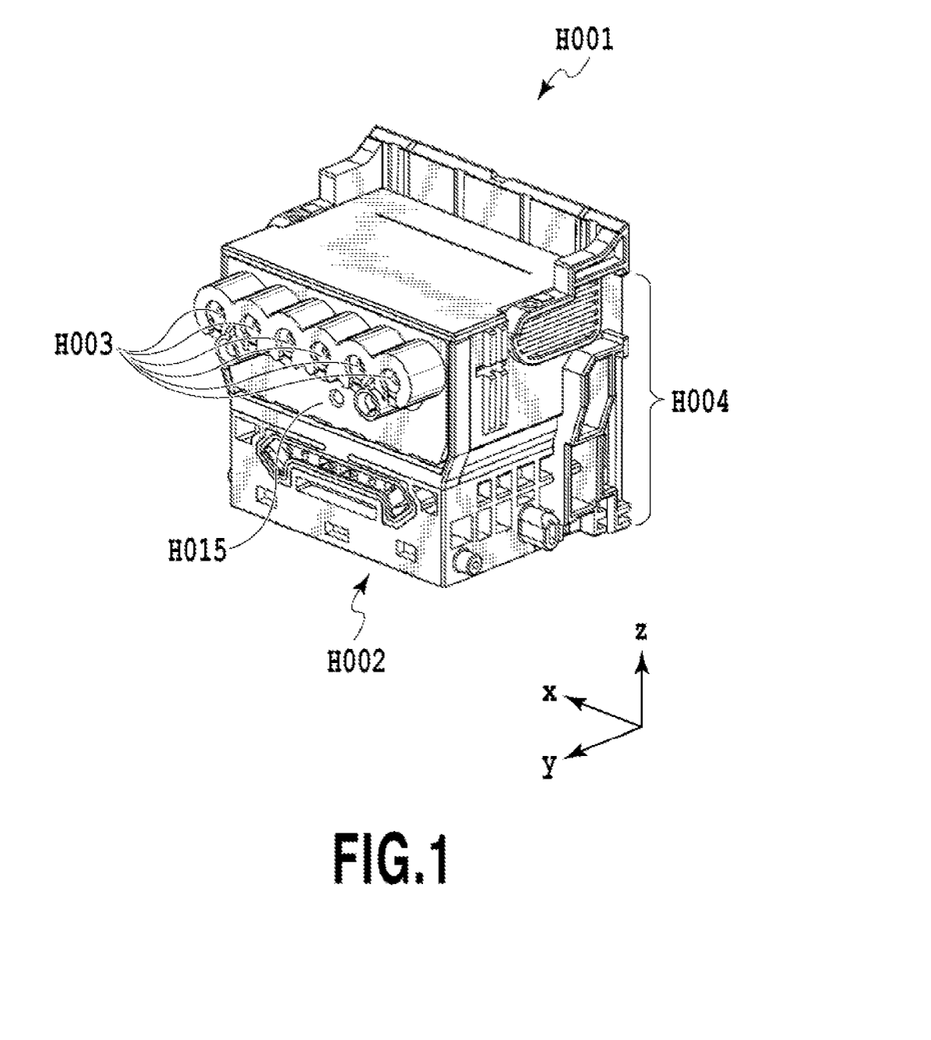
FIG. 1 is a perspective view of an inkjet head.

FIG. 1 is a perspective view of an inkjet head H001 (hereinafter referred to as an IJ head H001), which can be used as a liquid ejection head of the present invention. The IJ head H001 mainly includes an ejection element section H002, an ink storage member H004, which is a resin molded article of the present invention, and an ink introduction member H015.

It is assumed that the IJ head H001 of the present embodiment is a color inkjet head for ejecting ink of six colors to print an image. Accordingly, the ink introduction member H015 is equipped with ink supply ports H003 for six colors to guide ink supplied through tubes (not shown) to the ink storage member H004.

Inside the ink storage member H004, ink chambers and flow channels are formed for six colors, respectively, to guide ink supplied from the ink supply ports H003 to the ejection element section H002. In the ejection element section H002, a plurality of ejection elements are arranged for each ink color. Each ejection element ejects ink as droplets in a −z direction in response to an ejection signal.

Figure 2:
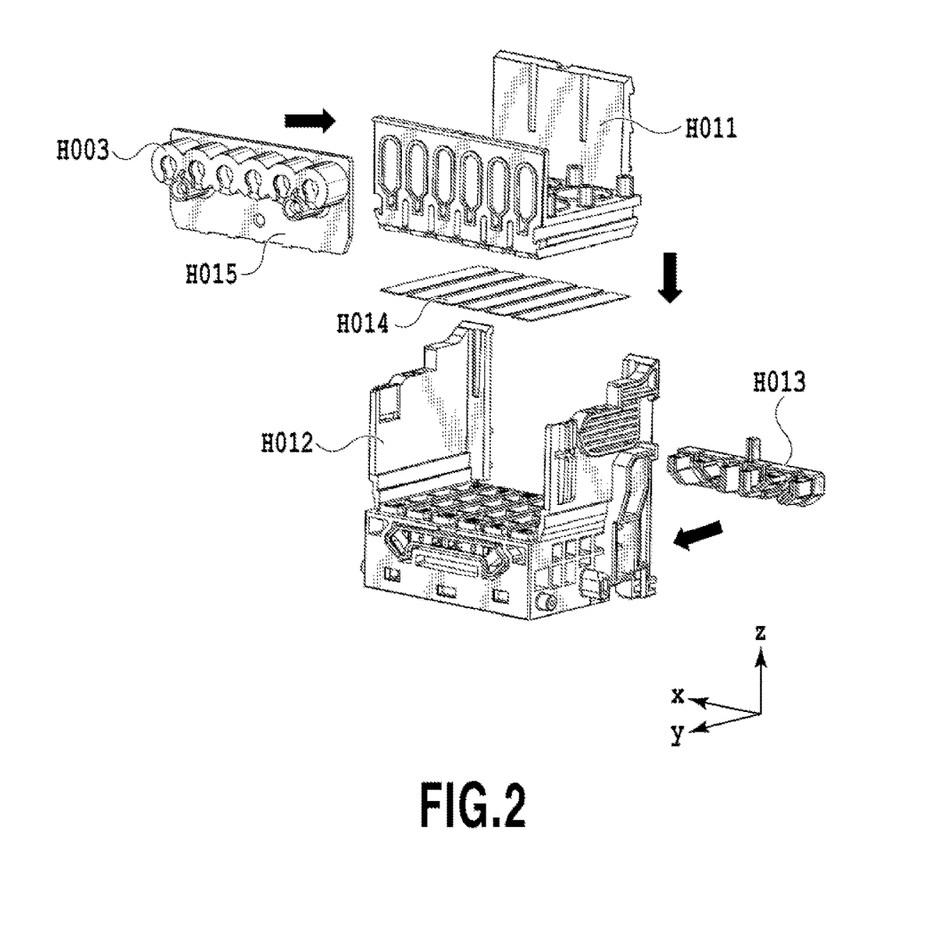
FIG. 2 is an exploded perspective view of the inkjet head.

FIG. 2 is an exploded perspective view showing primarily molded parts in die slide injection molding of the present embodiment. In primary molding, a first molded part H011, a second molded part H012, and a flow channel lid member H013 are formed. These three parts are molded in different positions in a main mold. Next, the first molded part H011 and the second molded part H012 are engaged in a z direction with a filter H014 sandwiched therebetween. Further, the flow channel lid member H013 is brought into contact with the second molded part H012 from a −y side. After that, the three parts are joined together by using resin for joining while they are engaged with each other, thereby forming the ink storage member H004. The IJ head H001 of the present embodiment is obtained by further attaching, to the ink storage member H004, the ink introduction member H015 from a +y side and the ejection element section H002 from the −z side.

Inside the second molded part H012, liquid chambers and flow channels for guiding ink to the ejection element section H002 are formed independently for six ink colors. The liquid chambers and the flow channels have a complicated hollow structure for miniaturization. The hollow structure is formed by injecting resin while a first core and a second core are inserted from the −z side and the −y side, respectively, in the primary molding. The present invention is characterized by the shapes of the cores, which will be described later in detail.

Figure 3:
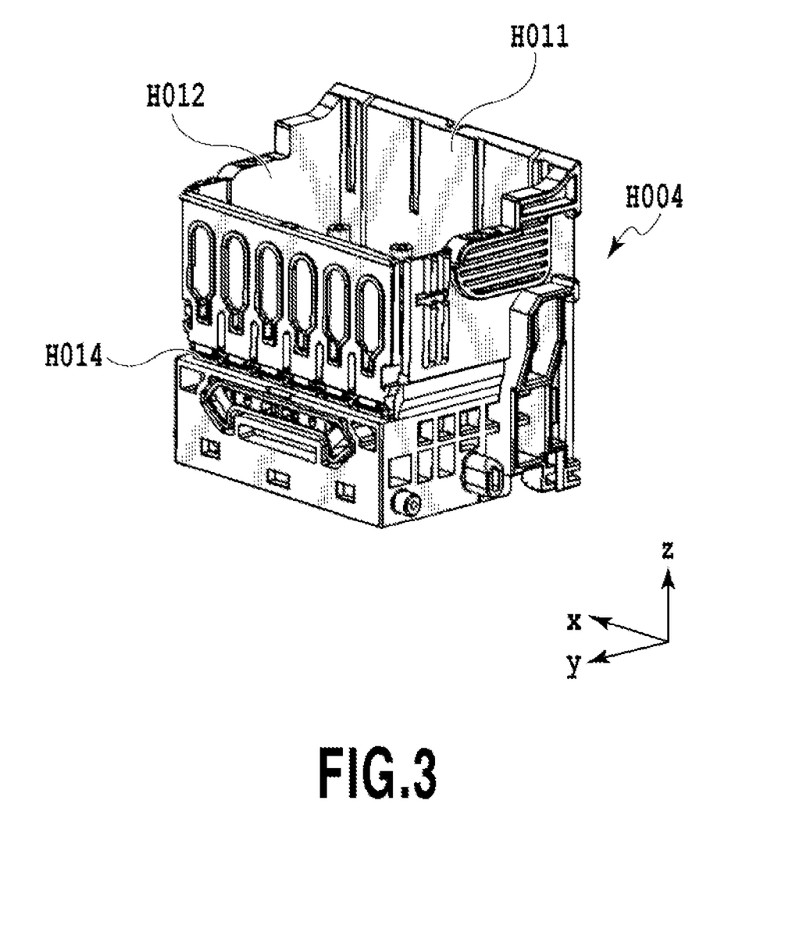
FIG. 3 is an illustration of a state where primarily molded parts are engaged.

FIG. 3 shows a state where the first molded part H011, the second molded part H012, and the flow channel lid member H013 molded in the primary molding are engaged. The first molded part H011 and the second molded part H012 are stacked in the z direction with the filter H014 sandwiched therebetween, and opposing walls of the first molded part H011 and second molded part H012 are thereby engaged with each other. As a result, a box shape is formed by the four walls.

Figure 4:
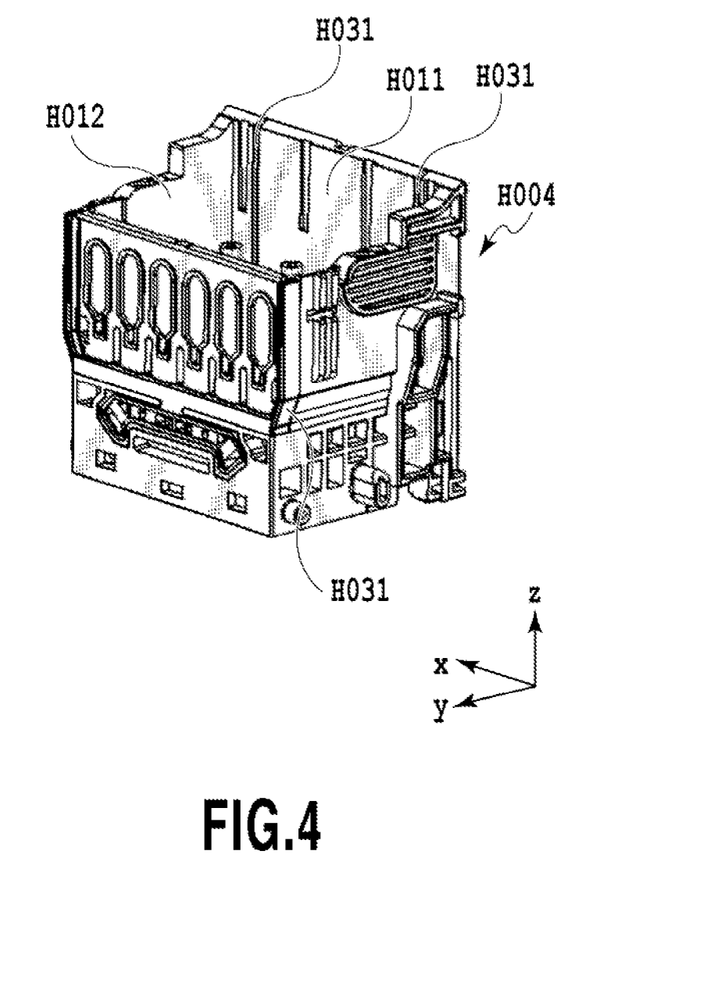
FIG. 4 is an illustration of a state where the primarily molded parts are joined.

FIG. 4 shows a state where liquid resin is further injected into the parts shown in FIG. 3 to join them. Gate runners H031 for guiding the liquid resin are formed in the engaged portions between the first molded part H011 and the second molded part H012 and the engaged portions between the second molded part H012 and the flow channel lid member H013 (not shown). If the liquid resin is injected, the resin flows along the gate runners H031 and joins the first molded part H011, the second molded part H012, and the flow channel lid member H013. A sealing member can be quickly guided to all the engaged portions by providing the gate runners H031.

The die slide injection molding process of the present embodiment will be hereinafter described in detail with reference to FIGS. 5 to 8C. It should be noted that the x, y, and z axes shown in FIGS. 1 to 4 and those in FIGS. 5 to 8C are common directional axes which are fixed with respect to the ink storage member H004 and are irrelevant to the direction of gravity. In the actual use of the finished IJ head, the −z direction in FIGS. 1 to 4 corresponds to the direction of gravity. However, in the die slide injection molding process shown in FIGS. 5 to 8C, the −y direction corresponds to the direction of gravity.

Figure 5:
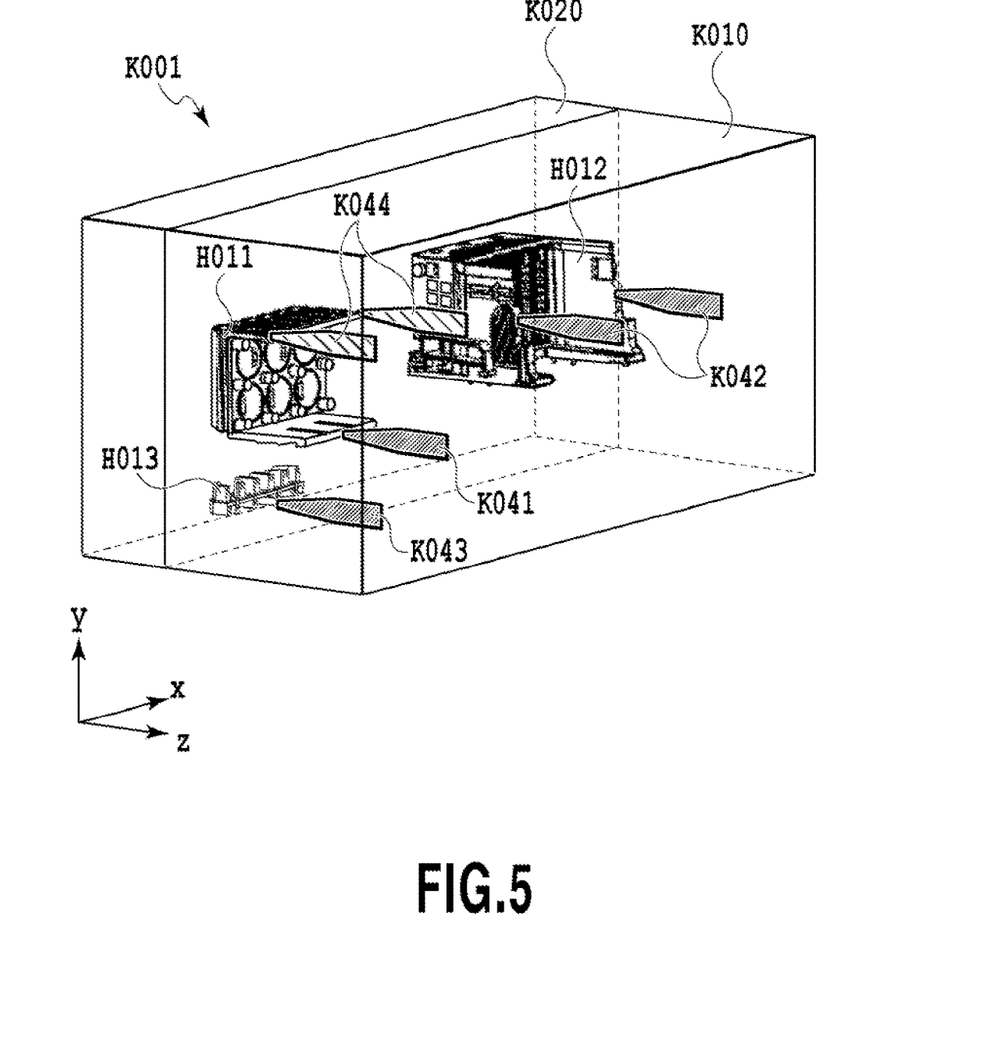
FIG. 5 is an illustration of primary molding in a main mold.

FIG. 5 is an illustration of primary molding in a main mold K001 of the present embodiment. The main mold K001 used in the present embodiment includes a fixed mold K010 and a movable mold K020 removable from the fixed mold K010 in the −z direction. Further, first to fourth valve gates K041 to K044 are connected to a surface of the fixed mold K010 on the +z side. Each valve gate can inject liquefied resin into the mold at a predetermined timing.

In the primary molding, liquid resin is injected from the first to third valve gates K041, K042, and K043 while the fixed mold K010 and the movable mold K020 are clamped as shown in FIG. 5 to form the first molded part H011, the second molded part H012, and the flow channel lid member H013. On the −x side of the main mold, the first molded part H011 is molded by using the first valve gate K041. In a position spaced apart from the first molded part H011 in the −y direction, the flow channel lid member H013 is molded by using the third valve gate K043. In a position spaced apart from the first molded part H011 in the +x direction, the second molded part H012 is molded by using the second valve gate K042.

Figure 6A:
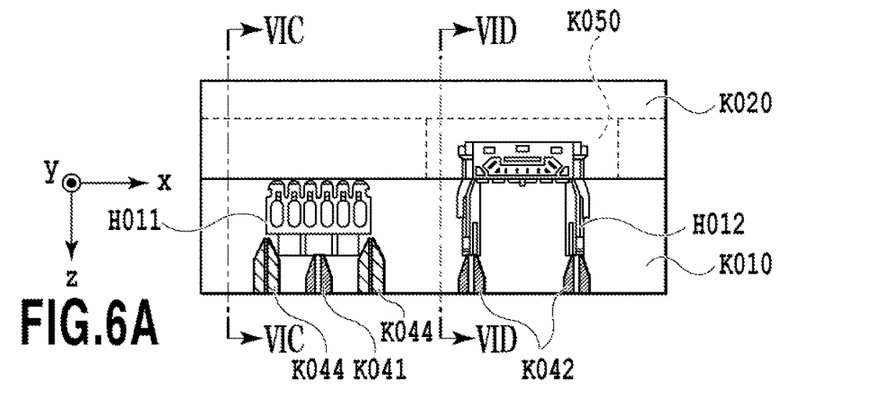
FIGS. 6A to 6D are cross-sectional views of the main mold in the primary molding.
Figure 6B:
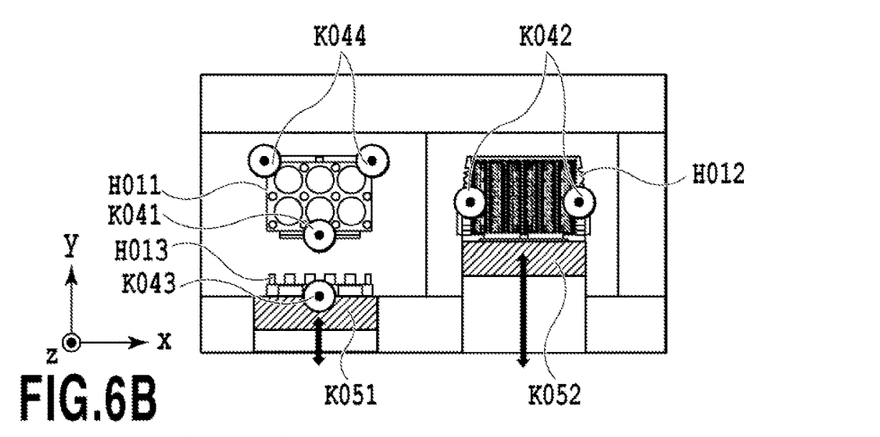
Figure 6C:
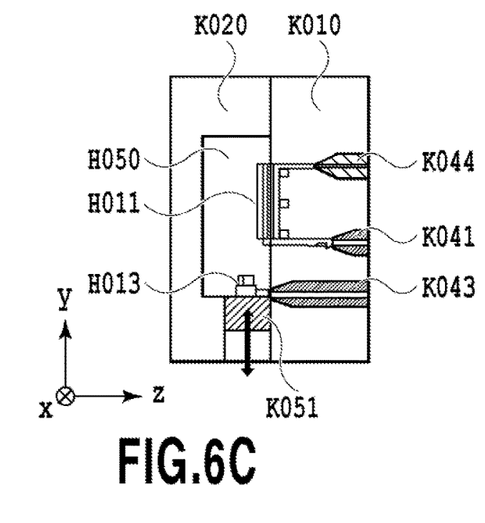
Figure 6D:
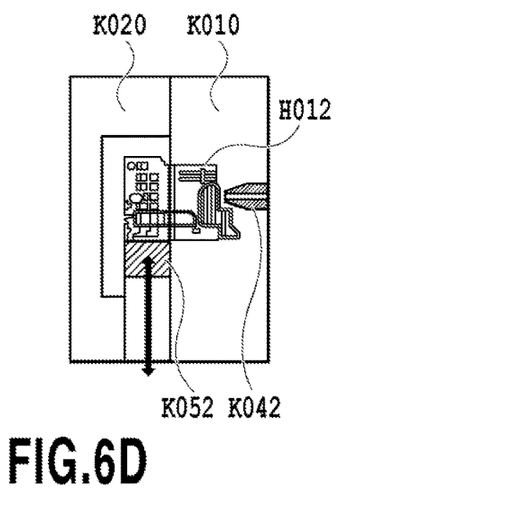

FIGS. 6A to 6D are cross-sectional views of the main mold K001 in the primary molding shown in FIG. 5. FIGS. 6A and 6B are perspective views of the main mold K001 of FIG. 5 when viewed from the +y side and the +z side. FIG. 6C is a cross-sectional view along VIC-VIC in FIG. 6A. FIG. 6D is a cross-sectional view along VID-VID in FIG. 6A. A die slide mold K050 movable in the +x and −x directions inside the movable mold K020 is located in a position shown in FIG. 6A in the primary molding.

As shown in FIG. 6A, the most part of the first molded part H011 is molded in the fixed mold K010. In the primary molding, in the fixed mold K010, slide cores (not shown) are put from the +y and −y sides, and in this state, liquefied resin is injected from the first valve gate K041. The flow channel lid member H013 is mainly molded in the movable mold K020 as shown in FIG. 6C. In the primary molding, in the movable mold K020, a first slide core K051 movable in the +y and −y directions is put to a position of the third valve gate K043 from the −y side, and in this state, liquefied resin is injected from the third valve gate K043. In the primary molding, the first molded part H011 and the flow channel lid member H013 are molded in the positions that are about the same in the x direction and different in the y direction.

The second molded part H012 is molded in both the die slide mold K050 inside the movable mold K020 and the fixed mold K010 as shown in FIG. 6A. More specifically, a flow channel structure of the second molded part H012 is mainly molded in the die slide mold K050 and two walls extending in the +z direction from the flow channel structure are mainly molded in the fixed mold K010. Further, in the die slide mold K050, a second slide core K052 movable in the +y and −y directions is put from the −y side as shown in FIGS. 6B and 6D, and in this state, liquefied resin is injected from the second valve gate K042. The die slide mold K050, the first slide core K051, and the second slide core K052 are actuated by a pneumatic, hydraulic, or electric cylinder.

Figure 7A:
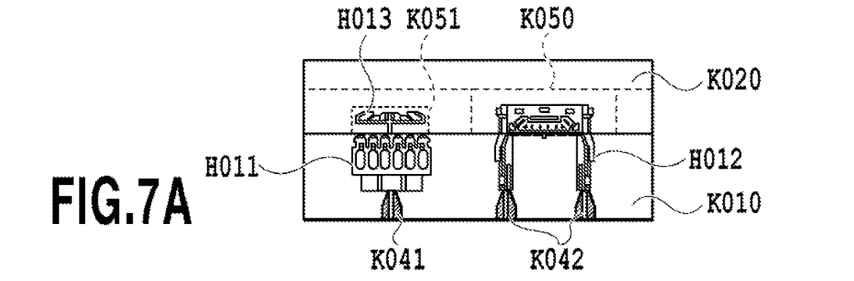
FIGS. 7A to 7D are illustrations of steps after the primary molding is finished.
Figure 7B:
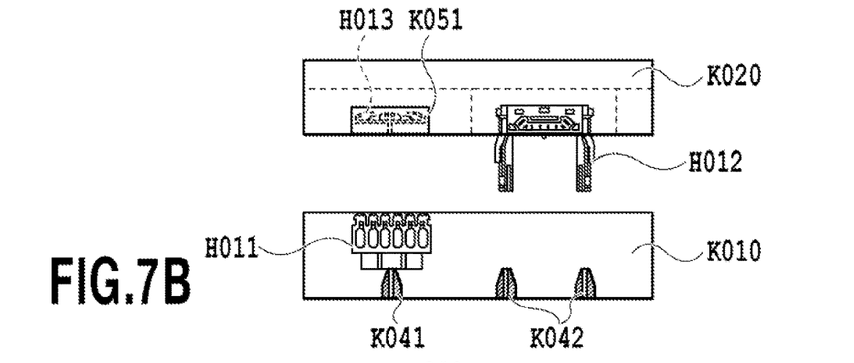

FIGS. 7A to 7D are cross-sectional views showing steps after the primary molding is finished in the die slide injection molding. FIG. 7A corresponds to FIG. 6A. After the primary molding is finished, the movable mold K020 moves in the −z direction away from the fixed mold K010 (FIG. 7B). At this time, the first molded part H011 formed mainly by the fixed mold K010 is held in the fixed mold K010, and the flow channel lid member H013 formed mainly by the movable mold K020 is held in the movable mold K020. The second molded part H012 formed by putting the second slide core K052 inside the die slide mold K050 is held in the die slide mold K050 after the second slide core K052 is removed in the −y direction.

Figure 7C:
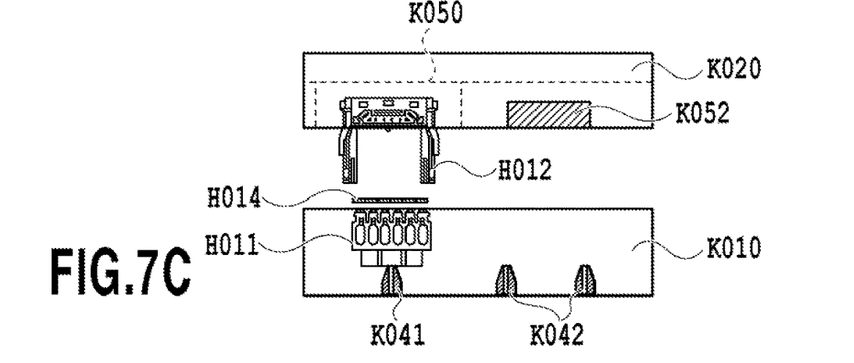
Figure 7D:
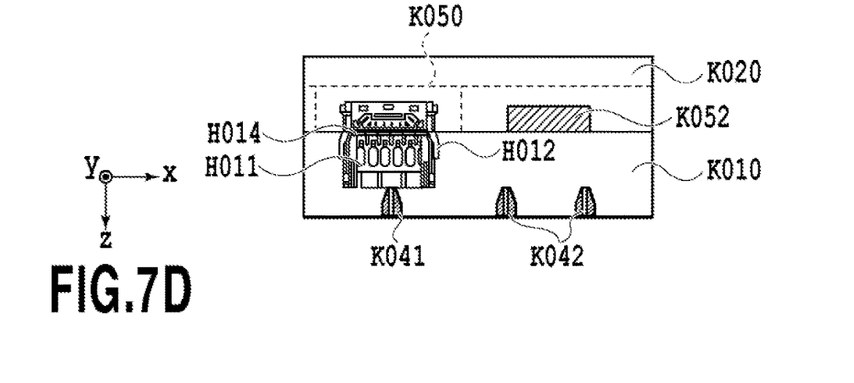

Next, inside the movable mold K020, the die slide mold K050 moves in the −x direction to align the second molded part H012 with the first molded part H011 and the flow channel lid member H013 in the x direction (FIG. 7C). Then, a prepared filter H014 is inserted between the first molded part H011 and the second molded part H012 and the movable mold K020 moves in the +z direction again (FIG. 7D). Further, the first slide core K051 is slid in the +y direction and brought into contact with the second molded part H012 that has moved there. In the above manner, the first molded part H011, the second molded part H012, and the flow channel lid member H013 are engaged with each other, thereby forming the liquid storage container shown in FIG. 3.

Figure 8A:
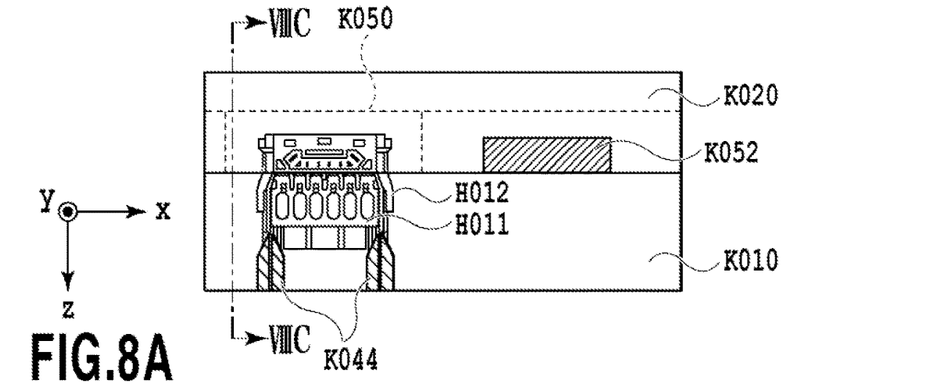
FIGS. 8A to 8C are cross-sectional views of the mold in secondary molding.
Figure 8B:
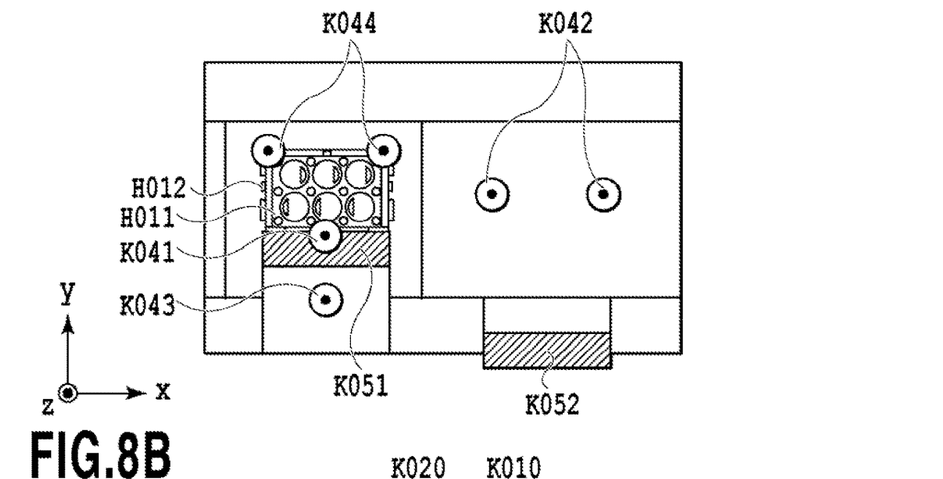
Figure 8C:
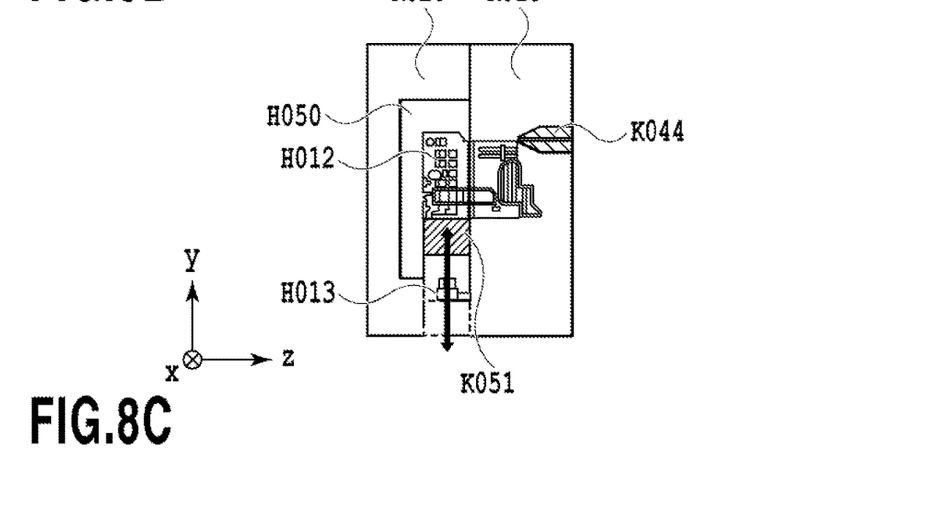

FIGS. 8A to 8C are cross-sectional views of the mold K001 in the secondary molding in the die slide injection molding. FIG. 8A corresponds to the state shown in FIG. 7D. At this time, as shown in FIGS. 8B and 8C, the first slide core K051 moves in the +y direction toward the second molded part H012 that has moved there to bring the flow channel lid member H013 molded in the primary molding into contact with the second molded part H012. The first slide core K051 supports the molded parts from the −y side, that is, from below in the direction of gravity. In the secondary molding, the fixed mold K010 and the movable mold K020 are clamped in this state and liquefied resin is injected from the fourth valve gate K044.

Figure 9A:
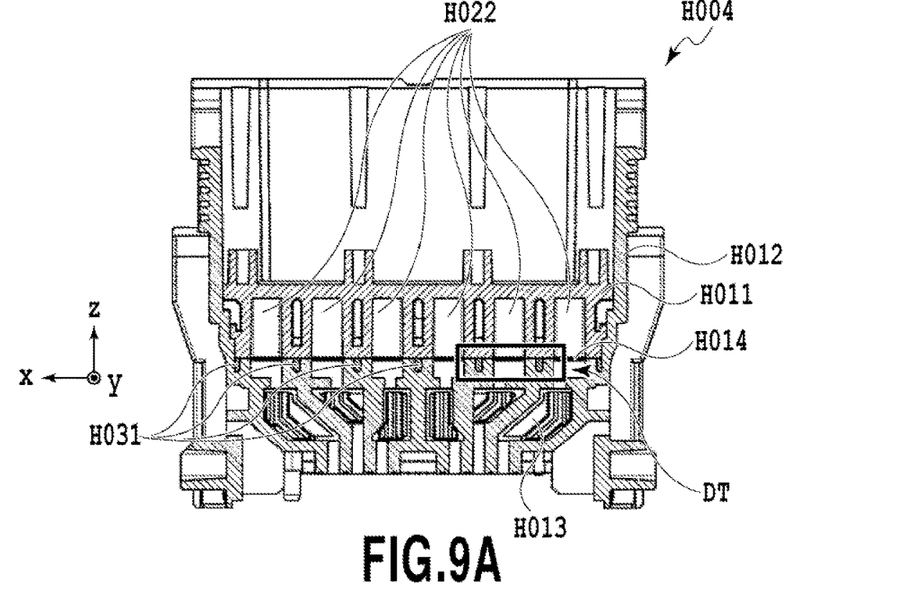
FIGS. 9A to 9C are illustrations of a joining state in the secondary molding.
Figure 9B:
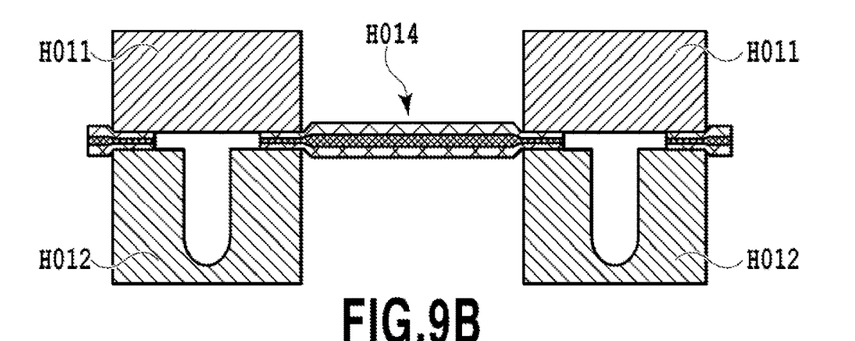
Figure 9C:
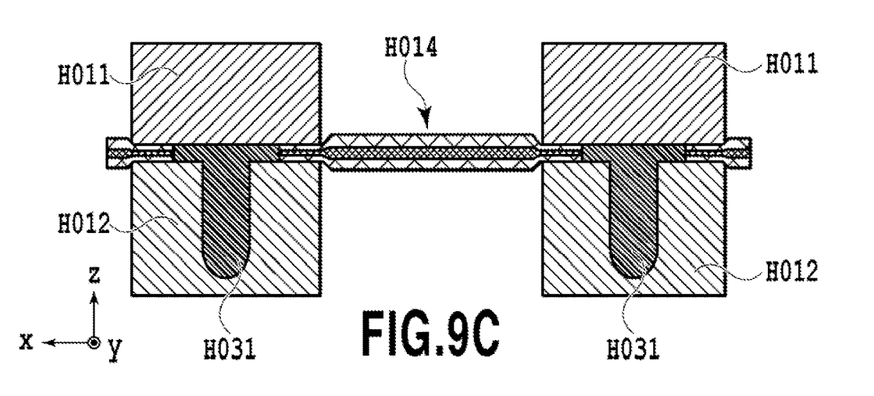

FIGS. 9A to 9C are illustrations of a joining state in the secondary molding. FIG. 9A is a cross-sectional view of the ink storage member H004 along an xz-plane. FIGS. 9B and 9C are enlarged cross-sectional views of an area surrounded by a rectangle DT. FIGS. 9B and 9C show states before and after injecting liquefied resin, respectively.

The engagement between the first molded part H011 and the second molded part H012 forms six liquid chambers H022 corresponding to respective ink colors in the ink storage member H004. When liquefied resin is injected from the fourth valve gate K044, the liquefied resin flows along the gate runners H031 and fixes the filter H014 in the positions where the gate runners H031 are located.

Figure 10:
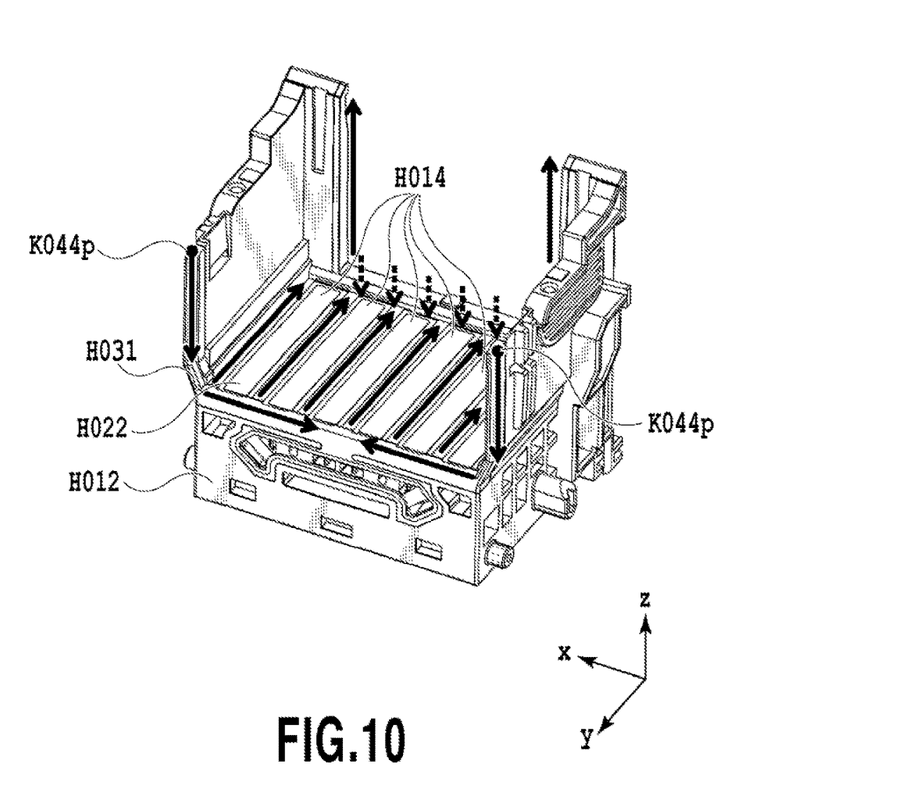
FIG. 10 is an illustration of channels through which liquefied resin flows in the secondary molding.

FIG. 10 is an illustration of channels through which the liquefied resin flows along the gate runners H031 in the secondary molding. FIG. 10 shows a state where the first molded part H011 is removed for ease of explanation. In FIG. 10, the −y direction corresponds to the direction of gravity. The resin injected from two injection positions K044p of the fourth valve gate K044 flows along the gate runners H031 in the directions shown by arrows, and joins the first molded part H011 and the second molded part H012 with the filter H014 sandwiched therebetween. In this manner, the filter H014 extending along the xy-plane is sealed while being held between the first and second molded parts from the +z and −z sides and the liquid chambers H022 are separated from each other. Consequently, the filter H014 can protect each liquid chamber H022 against foreign matter.

After that, the liquefied resin that has reached the wall on the −y side further moves ahead in the −z direction along the gate runners H031 to join the flow channel lid member H013 and the second molded part which are engaged in this area. As a result, ink flow channels for six colors connecting the respective liquid chambers H022 to the ejection element section H002 are obtained.

After the aforementioned primary molding and secondary molding are finished, the movable mold K020 moves in the −z direction again to open the main mold K001, which allows the finished ink storage member H004 to be extracted from the main mold K001.

Next, the flow channel structure that characterizes the present invention and the shapes of the cores that implement the structure will be described in detail. In an ejection element section H002 of a serial inkjet printing apparatus, ejection element arrays that eject different types of ink are arranged in parallel in a scanning direction of the IJ head (i.e., the x direction). However, if a lot of ejection element arrays are arranged in the scanning direction (the x direction), the width of the ejection element section H002 in the x direction becomes large, which results in a decrease in printing speed. Therefore, the ejection element section H002 needs to be miniaturized by arranging the ejection element arrays in the x direction at high density.

On the other hand, the liquid chambers H022 of the IJ head H001 need to have sufficient capacity to store bubbles that are gradually accumulated along with ejection operations. That is, in the second molded part (i.e., the flow channel member) that guides ink to the miniaturized ejection element section H002 while ensuring sufficient capacity to store bubbles, flow channels need to be sloped to become narrower in the x direction toward the −z side. However, such flow channels cannot be formed by clamping the fixed mold K010 and the movable mold K020 in the z direction. Therefore, the present embodiment is provided with a second slide core K052, which is movable in the +y and −y directions and is sloped to become narrower in the x direction toward the −z side, and the primary molding is performed with the second slide core K052 inserted into an area where the second molded part H012 will be formed.

Figure 11A:
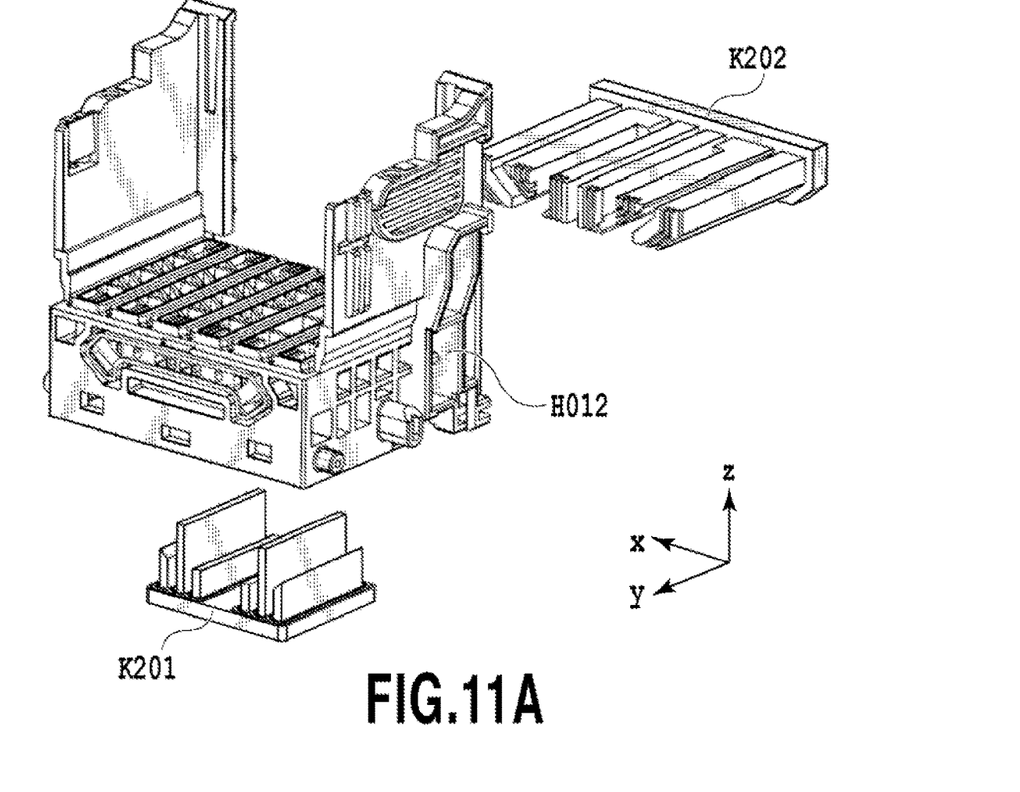
FIGS. 11A and 11B are illustrations of cores used for molding a second molded part.
Figure 11B:
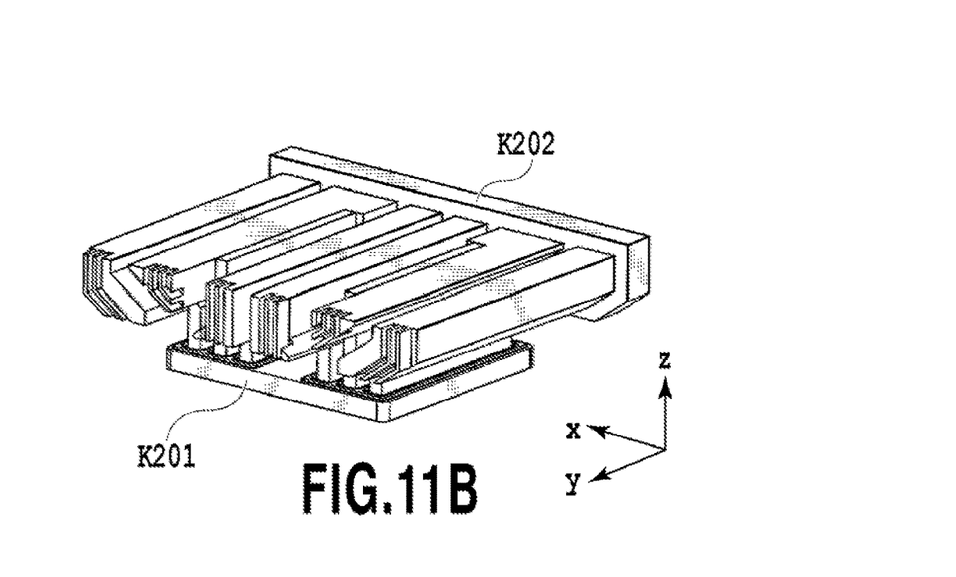

FIGS. 11A and 11B are illustrations of cores used for molding the second molded part H012. A first core K201 is formed on a surface of the die slide mold K050. An area into which the ejection element section H002 is fitted and six flow channels for guiding ink to the ejection element arrays of the ejection element section H002 are formed by locating the first core K201 on the −z side of the second molded part H012.

A second core K202 is formed on the second slide core K052. When the second slide core K052 is located in the position shown in FIG. 6D, the second core K202 is located in the area where the second molded part H012 will be formed. In this state, liquid resin is injected into the area, thereby forming flow channels that gradually become narrower in the x direction toward the −z side inside the second molded part H012.

FIG. 11B is an illustration of an engaged state of the first core H201 and the second core K202 in the primary molding. As shown in FIG. 11B, resin is injected while the first core H201 and the second core K202 are engaged in the intersecting directions, thereby molding walls in areas where the cores do not exist. Areas where the cores exist will become hollow areas, namely, flow channels. Therefore, in the primary molding, it is necessary to connect the second core K202, which forms the areas to be liquid chambers, and the first core K201, which forms liquid channels to guide ink from the liquid chambers to the ejection element section H002, to each other at six positions corresponding to ink colors.

In the secondary molding, after extracting the second core H202, the flow channel lid member H013 is engaged with the second molded part H012 from the −y side and joined to the second molded part H012. At this time, the first molded part H011 after extracting the second core H202 includes elongated hollow areas separated by thin walls and arranged in parallel, which is not so strong. For that reason, if resin is injected while clamping, the pressure of the resin may deform the flow channel structure or the resin may flow out of the proper channels.

Figure 12:
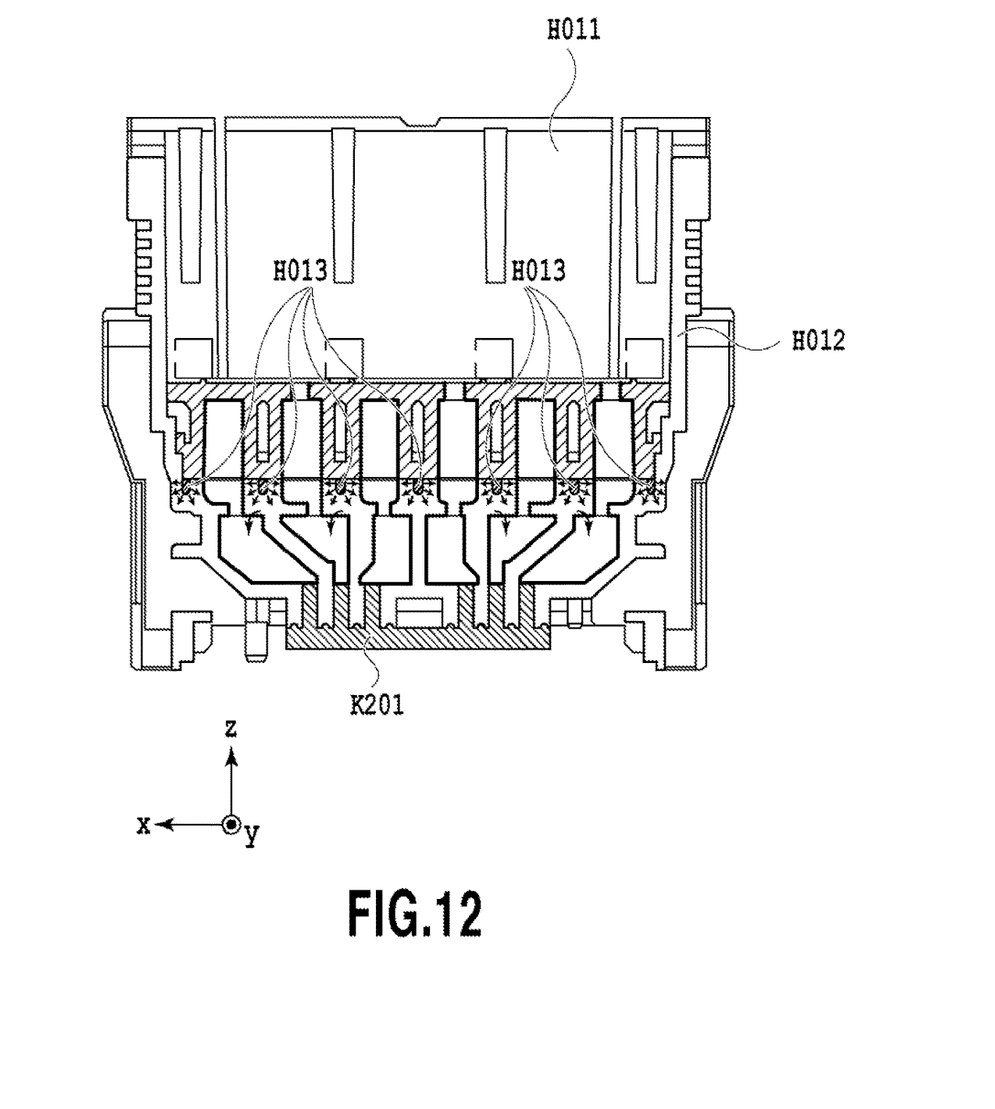
FIG. 12 is a cross-sectional view showing the action of an injection pressure.

FIG. 12 is a cross-sectional view showing the action of the injection pressure. FIG. 12 corresponds to the step shown in FIG. 7D. That is, the second core K202, which has formed the flow channel structure, is removed along with the slide core K052 and six hollow liquid chambers H022 are formed in the areas where the second core K202 has existed. Although not shown in the drawing, the flow channel lid member H013 molded in the primary molding is brought into contact with the second molded part H012 from the −y side (i.e., from the backside of the drawing) along with the movement of the first slide core K051. Since the first core K201 is formed on the moving surface of the die slide mold K050, it remains in contact with the second molded part H012 even in the secondary molding.

In the first core K201 shown in FIG. 12, all the six walls, which will form channels, have the same height and shape in the +z direction, and all of their ends are in contact with the second core in the +z direction in the primary molding. Accordingly, in the state shown in FIG. 12 where the second core K202 is removed, all the ends of the six walls of the first core K201 are in contact with the hollow areas in the +z direction but are not in contact with wall areas. If liquid resin is injected in this state, the injection pressure of the resin spreads around the gate runners H031 and the pressure in the −z direction acts on the walls forming the hollow liquid chambers, which may result in deformation of the liquid chambers H022. In order to avoid the deformation, the present embodiment is characterized by the shapes of the first core K201 and the second core K202 and their engaged state.

Figure 13:
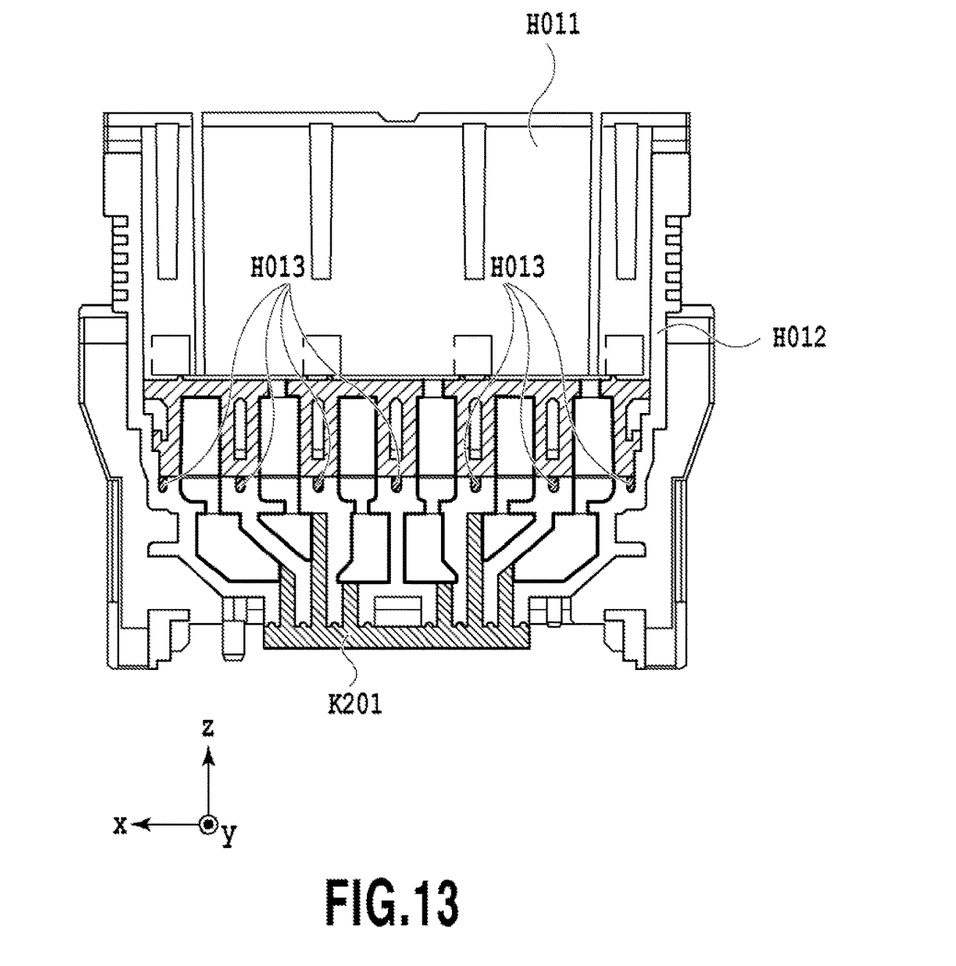
FIG. 13 is an illustration of the action of an injection pressure in the present embodiment.

FIG. 13 is a cross-sectional view showing the action of the injection pressure in the case of using the first core K201 and second core K202 of the present embodiment. In the present embodiment, some of the ends of the first core K201 are not in contact with the second core K202 in the +z direction when the first core K201 and the second core K202 are engaged. More specifically, as shown in FIG. 11A, six walls of the first core K201 have different heights and end shapes such that four of the six walls are in contact with the second core not in the +z direction but in the x direction and are exposed in the +z direction. Since the exposed areas are formed, walls can be molded in these areas in the primary molding and the molded walls can be directly supported from the −z side in the secondary molding. Therefore, even if liquid resin is injected in the secondary molding, drag in the +z direction against the injection pressure is produced in the molded walls supported by the first core K201 and the molded article can be prevented from being deformed. In particular, since the two second walls from the outermost sides in the x direction extend in the +z direction to about the center of the hollow liquid chambers H022, the second molded part H012 can be securely supported in the secondary molding.

In the present embodiment, out of the six liquid chambers, four liquid chambers particularly susceptible to the injection pressure are supported in the secondary molding. However, all the liquid chambers or less liquid chambers may be supported as a matter of course. In either case, the effect of the present invention can be achieved as long as at least part of the ends of the first core in the +z direction is not in contact with the second core in the primary molding where the first core and the second core are engaged.

According to the present invention, the liquid chambers can be prevented from being deformed in the secondary molding and the injected resin can be guided to the proper channel. As a result, a high precision ink storage member H004 can be manufactured with high productivity.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-130581 filed Jun. 30, 2016, which is hereby incorporated by reference wherein in its entirety.

What is claimed is:

1. A resin molding method comprising:
    a first molding step of molding a first molded part and a second molded part in different positions in a mold by injecting resin into the mold; and
    a second molding step of joining the first molded part and the second molded part to form a resin molded article by engaging the first molded part and the second molded part in a first direction inside the mold and injecting resin into engaged portions,
    wherein in the first molding step, the second molded part is formed by injecting resin into an area where a first core movable in the first direction and a second core movable in a second direction intersecting with the first direction are engaged,
    wherein the first core comprises protrusions in the first direction,
    wherein in the second molding step, the second molded part is joined to the first molded part by injecting the resin while the first core is in contact with the second molded part and the second core is removed from the second molded part,
    wherein areas where the first core and the second core are located in the first molding step become hollow areas connected to each other by removing the first core and the second core from the second molded part, and
    wherein in the engagement in the first molding step, at least one of the protrusions of the first core in the first direction is not in contact with the second core in the first direction.

2. The resin molding method according to claim 1, wherein the mold includes a fixed mold and a movable mold movable in the first direction so as to switch between clamping of the fixed mold and the movable mold and removal of the movable mold from the fixed mold.

3. The resin molding method according to claim 2, wherein the mold includes a die slide mold movable in a third direction intersecting with the first direction and the second direction inside the movable mold, and
    wherein the resin molding method further comprises a step of aligning the second molded part supported by the die slide mold with the first molded part supported by the fixed mold in the third direction by removing the movable mold from the fixed mold and moving the die slide mold in the third direction between the first molding step and the second molding step.

4. The resin molding method according to claim 1, wherein in the first molding step, a third molded part is further molded in a position in the mold different from the positions where the first molded part and the second molded part are molded, and
    wherein in the second molding step, the first molded part, the second molded part, and the third molded part are joined and the resin molded article is formed by bringing the third molded part into contact with the second molded part in the second direction.

5. The resin molding method according to claim 1, wherein in the engagement in the first molding step, at least one of the protrusions of the first core extends to about a center of the hollow areas in the first direction.

6. The resin molding method according to claim 1, wherein the resin molded article is an ink storage member for separately supplying ink stored in each of the hollow areas to an ejection element section.

7. The resin molding method according to claim 6, wherein the first core has a shape to form an area where the ejection element section is to be located and flow channels for guiding ink to the ejection element section, and wherein the second core has a shape to form liquid channels for guiding ink from an area, which is larger in a third direction, intersecting with the first direction and the second direction, than the ejection element section and the first core, to the flow channels formed by the first core.

* * * * *